US009934681B2

(12) United States Patent
Torbett

(10) Patent No.: US 9,934,681 B2
(45) Date of Patent: Apr. 3, 2018

(54) ELECTROMAGNETIC SIGNAL BOOSTER

(71) Applicant: HALLIBURTON ENERGY SERVICES, INC., Houston, TX (US)

(72) Inventor: Patrick William Torbett, Geary, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 29 days.

(21) Appl. No.: 14/773,310

(22) PCT Filed: Sep. 3, 2015

(86) PCT No.: PCT/US2015/048372
§ 371 (c)(1),
(2) Date: Sep. 4, 2015

(87) PCT Pub. No.: WO2016/036961
PCT Pub. Date: Mar. 10, 2016

(65) Prior Publication Data

US 2016/0300484 A1 Oct. 13, 2016

Related U.S. Application Data

(60) Provisional application No. 62/046,232, filed on Sep. 5, 2014.

(51) Int. Cl.

| | |
|---|---|
| ***G01V 3/00*** | (2006.01) |
| ***G08C 25/04*** | (2006.01) |
| ***E21B 47/12*** | (2012.01) |
| ***E21B 49/00*** | (2006.01) |
| *E21B 47/024* | (2006.01) |

(52) U.S. Cl.
CPC ............ *G08C 25/04* (2013.01); *E21B 47/122* (2013.01); *E21B 49/00* (2013.01); *E21B 47/024* (2013.01)

(58) Field of Classification Search
CPC ....... G08C 25/04; E21B 47/122; E21B 49/00; E21B 47/024
USPC ........................................................ 340/854.1
See application file for complete search history.

(56) References Cited

U.S. PATENT DOCUMENTS 5,428,836 A * 6/1995 Sanecki .................. H04B 1/30 455/209
6,001,065 A * 12/1999 DeVito .................. G06F 3/015 340/4.11

(Continued)

FOREIGN PATENT DOCUMENTS

WO 2003/043205 5/2003

*Primary Examiner* — Kerri McNally
*Assistant Examiner* — Thang Tran
(74) *Attorney, Agent, or Firm* — John Wustenberg; Tumey L.L.P.

(57) ABSTRACT

An electromagnetic (EM) signal booster, in some embodiments, comprises a bandpass filter comprising a high pass filter and a low pass filter coupled to the high pass filter, and further comprising a low cutoff frequency and a high cutoff frequency, both cutoff frequencies being adjustable; a first amplifier coupled to the high pass filter; and a second amplifier coupled to the first amplifier, wherein the high cutoff frequency is adjusted to within a first threshold value above a minimum high cutoff frequency and the low cutoff frequency is adjusted to within a second threshold value below a maximum low cutoff frequency.

18 Claims, 6 Drawing Sheets

(56) References Cited

U.S. PATENT DOCUMENTS

| | | | | |
|---|---|---|---|---|
| 6,552,962 | B1 * | 4/2003 | Varsamis | G01V 1/44 181/104 |
| 6,741,847 | B1 * | 5/2004 | Claxton | H03D 7/163 455/207 |
| 8,547,118 | B1 * | 10/2013 | Vojjala | G06F 3/044 324/667 |
| 2003/0161392 | A1 | 8/2003 | Miller | |
| 2004/0162495 | A1 * | 8/2004 | Quenet | A61B 5/0452 600/509 |
| 2005/0107079 | A1 * | 5/2005 | Schultz | E21B 47/122 455/422.1 |
| 2005/0169488 | A1 * | 8/2005 | Kato | H04S 7/302 381/98 |
| 2006/0007221 | A1 * | 1/2006 | Eaton | H04N 17/04 345/207 |
| 2006/0284669 | A1 | 12/2006 | Moore, III | |
| 2006/0290528 | A1 * | 12/2006 | MacPherson | G01V 11/002 340/853.1 |
| 2007/0247328 | A1 * | 10/2007 | Petrovic | G01V 11/002 340/853.7 |
| 2007/0247329 | A1 * | 10/2007 | Petrovic | G01V 11/002 340/854.4 |
| 2007/0257830 | A1 | 11/2007 | Savage et al. | |
| 2009/0175466 | A1 * | 7/2009 | Elko | H04R 3/005 381/94.2 |
| 2010/0039286 | A1 * | 2/2010 | Robbins | G01V 11/002 340/855.3 |
| 2011/0026507 | A1 * | 2/2011 | Katsube | H03H 7/0153 370/338 |
| 2011/0129047 | A1 * | 6/2011 | Mashino | H04B 1/1027 375/350 |
| 2011/0274429 | A1 * | 11/2011 | Caplan | H04B 10/5561 398/65 |
| 2012/0212288 | A1 * | 8/2012 | Masui | H03H 11/0427 327/557 |
| 2012/0269244 | A1 * | 10/2012 | Johnson | H04B 3/542 375/224 |
| 2015/0260813 | A1 * | 9/2015 | Mandal | G01V 3/32 324/322 |

* cited by examiner

ELECTROMAGNETIC SIGNAL BOOSTER

REFERENCE TO RELATED APPLICATIONS

This application claims priority to U.S. Provisional Application No. 62/046,232, filed on Sep. 5, 2014 and entitled "Electromagnetic Signal Booster," and it incorporates this provisional application by reference as if reproduced herein.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," was originally performed using wireline logging.

In wireline logging, an operator lowers a probe or "sonde" into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, the sonde measures various parameters of the Earth's formations and correlates them with the sonde's position as the operator pulls it uphole.

Although useful, wireline logging does have its limitations. If the borehole has been cased, i.e., lined with steel casing that has been cemented in place, then the sensing abilities of most wireline tools may be impaired. An operator will often remove any tubulars in the borehole before performing a wireline logging run, thereby adding cost and delay to the logging process. Moreover, the delay often degrades the logging measurement quality due to migration of fluid from the borehole into the formation or due to caving and collapse of the borehole wall. Wall caving can potentially also trap the logging tool downhole.

Consequently, engineers have created other logging methods such as logging while drilling ("LWD") or measurement while drilling ("MWD"). Such methods generally are unable to feasibly employ a logging cable because (if unprotected) the cable quickly gets pinched between the drillpipe and the borehole wall, resulting in the shearing or shorting out of the cable. Engineers have thus created various alternative wireless telemetry methods to communicate information between downhole tools and the surface. Such methods include, among others, electromagnetic ("EM") telemetry.

As drilling progresses, however, the distance between a downhole logging tool and a surface system receiving the tool's EM telemetry steadily increases. The increased distance produces a corresponding increase in the attenuation of the communication signal between the logging tool and the surface system. This is because electromagnetic signals, even at very low frequencies, become attenuated as they propagate along the borehole. Such attenuation results in a reduced signal-to-noise ratio (SNR) of the received signal, making error-free detection and demodulation at the surface progressively more difficult. Increasing the power output of the logging tool's transmitter is generally not an option, as the maximum transmission power is limited by the logging tool's overall power budget. Further, while increased amplification of the received signal can help reduce the error rate under some circumstances, such increased amplification also further amplifies the noise, which can cause increased interference with the received signal as the SNR decreases.

BRIEF DESCRIPTION OF THE DRAWINGS

Accordingly, there are disclosed systems and methods for implementing an electromagnetic (EM) signal booster. In the drawings.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe illustrative electromagnetic ("EM") signal boosters and methods for configuring and operating said EM signal boosters. Illustrative well logging environments suitable for operating such EM signal boosters are first described, followed by a more detailed description of a logging system incorporating an illustrative EM signal booster. The operation of the EM signal booster is subsequently described as part of a transceiver within the logging system's surface system, as is a method for configuring a bandpass filter within the EM signal booster.

Figure 1:
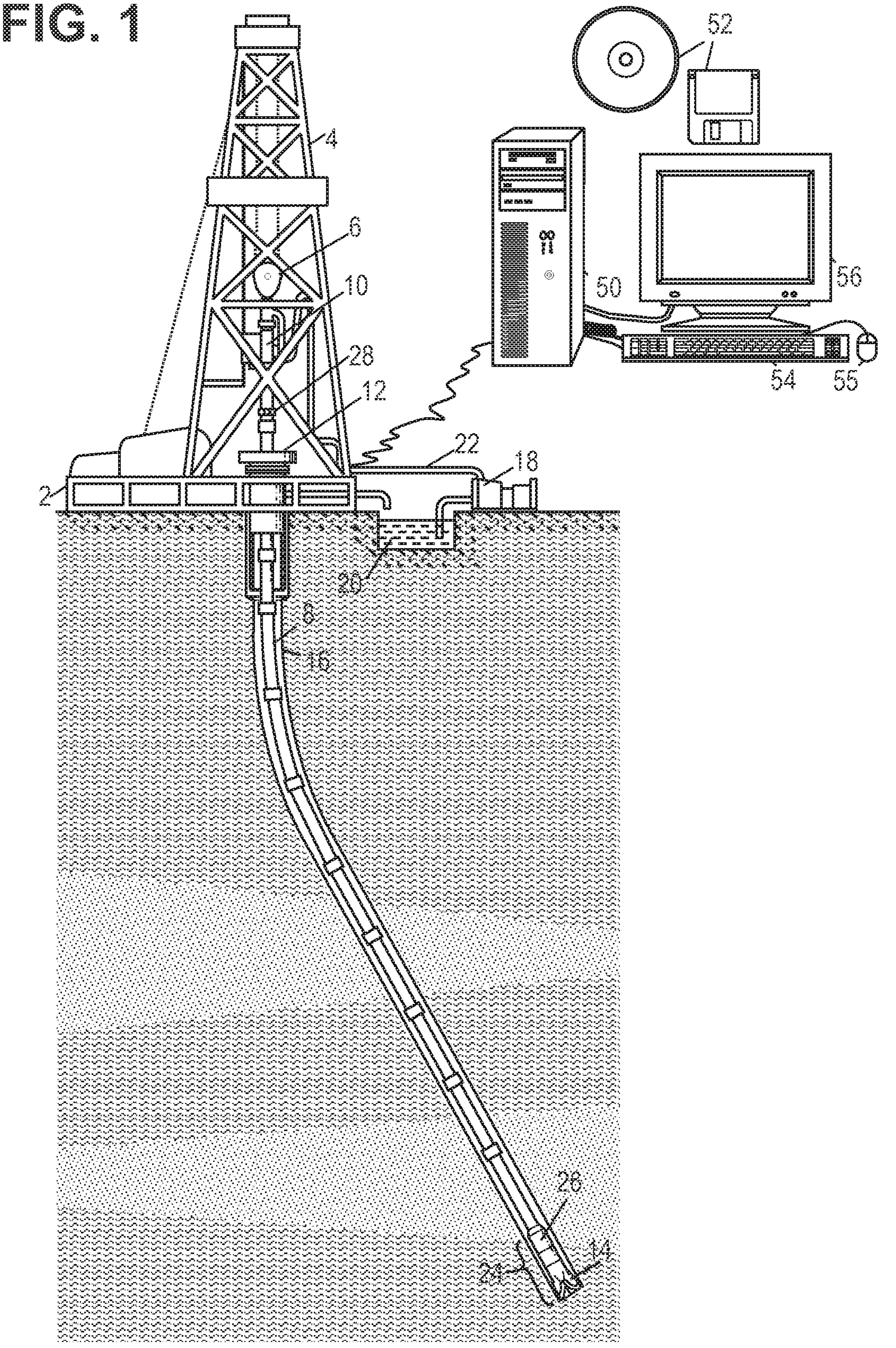
FIG. 1 is a schematic diagram of an illustrative drilling environment incorporating an LWD/MWD system.

The disclosed methods and systems are best understood in the context of the larger systems in which they operate. Accordingly, FIG. 1 shows an illustrative drilling environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formation layers. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly ("BHA") 24 that includes a mud motor and one or more "drill collars" (thick-walled steel pipe) that provide weight and rigidity to aid the drilling process. Some of these drill collars include built-in logging instruments (logging tool 26) to gather measurements of various drilling parameters such as location, orientation, weight-on-bit, borehole diameter, etc. The tool orientation may be specified in terms of a tool face angle (i.e., rotational orientation or azimuth), an inclination angle and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

In at least some illustrative embodiments, logging tool 26 maintains an EM communications link with the surface to exchange data. Tool measurements are transferred from logging tool 26 to surface transceiver 28, and commands and configuration data are transferred from surface transceiver 28 to logging tool 26, as well as to other components of BHA 24. A data processing system 50 receives a digital telemetry signal representing received downhole data from surface transceiver 28 (via a wired and/or wireless interface), demodulates and processes the signal, and displays the tool data or well logs to a user. Software (represented in FIG. 1 as non-transitory information storage media 52) governs the operation of system 50. A user interacts with system 50 and its software 52 via one or more input devices 54 and 55 and one or more output devices 56. In some system embodiments, a driller employs the systems to make geosteering decisions and communicate appropriate commands to the bottom-hole assembly 24.

Figure 2:
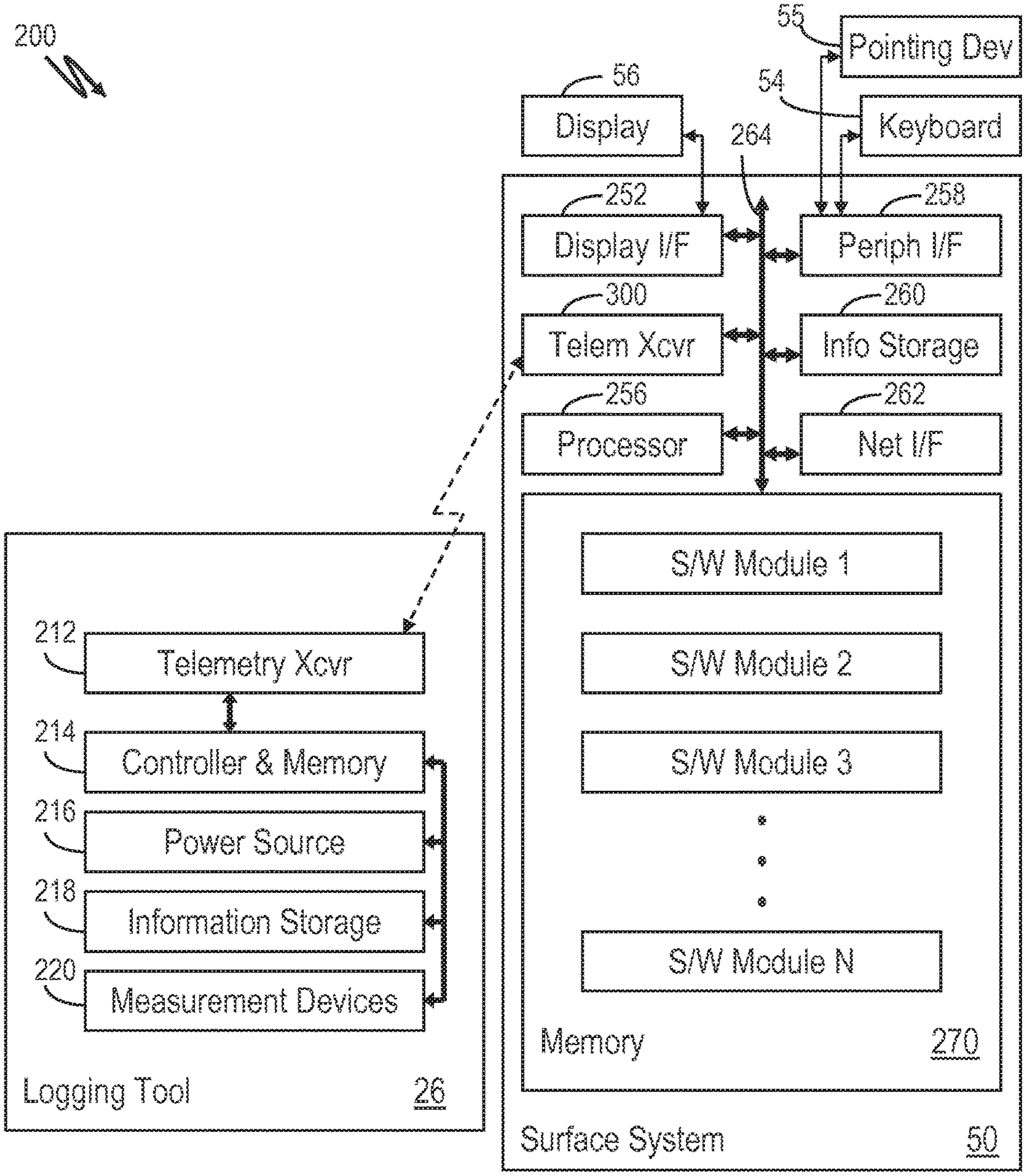
FIG. 2 is a block diagram of a logging tool and a surface system incorporating an illustrative EM signal booster.

FIG. 2 shows a more detailed block diagram of a logging system 200 that includes illustrative examples of both a surface system 50 and a logging tool 26. Surface system 50 is suitable for collecting, processing and displaying logging data via display 56, and in at least some embodiments generates formation logs from the logging data measurements and displays them to a user. A user may further interact with the system via keyboard 54 and pointing device 55 (e.g., a mouse) to send commands to the logging tool 26 to steer the drillstring in response to the received data. If desired, surface system 50 can be programmed to send such commands automatically in response to logging data measurements, thereby enabling surface system 50 to serve as an autopilot for the drilling process.

The surface system 50 further includes (e.g., disposed therein or connected thereto) a display interface 252, a telemetry transceiver 300, a processor 256, a peripheral interface 258, an information storage device 260, a network interface 262 and a memory 270. Bus 264 couples each of these elements to each other and transports their communications. Telemetry transceiver 300 enables the surface system 50 to communicate with the logging tool 26, and network interface 262 enables communications with other systems (e.g., a central data processing facility via the Internet). In accordance with user input received via peripheral interface 258, program instructions from memory 270 and/or information storage device 260, processor 256 processes telemetry information received via telemetry transceiver 300 to estimate the formation parameters in accordance and/or geosteering signals, and display them with display 56 to the user.

Surface system 50 communicates with logging tool 26, which receives control messages from, and provides measurement data to, surface system 50 via telemetry transceiver 212. Controller and memory 214 couples to telemetry transceiver 212, power source 216, information storage device 218 and one or more formation measurement devices 220, coordinating the operation of the various components. The formation measurements obtained by measurement devices 220 are forwarded to controller and memory 214 for storage within information storage device 308, with at least some of this information being communicated to surface system 50 via telemetry transceiver 212. The communicated information may include measurement data collected by any of a wide variety of sensors, including but not limited to resistivity, temperature, pressure, lubrication, vibration, strain and density sensors to monitor drilling conditions.

Surface system processor 256 and logging tool controller and memory 214 each generally operates in accordance with one or more programs stored on an information storage medium (e.g., information storage device 260). Various software modules, shown as software modules 1 thru N, are loaded into memory 270 where they are each accessed by processor 256 for execution. These modules provide much of the functionality of the logging system by processing the data acquired and communicated by the logging tool to the surface system and presented to the user.

Figure 3:
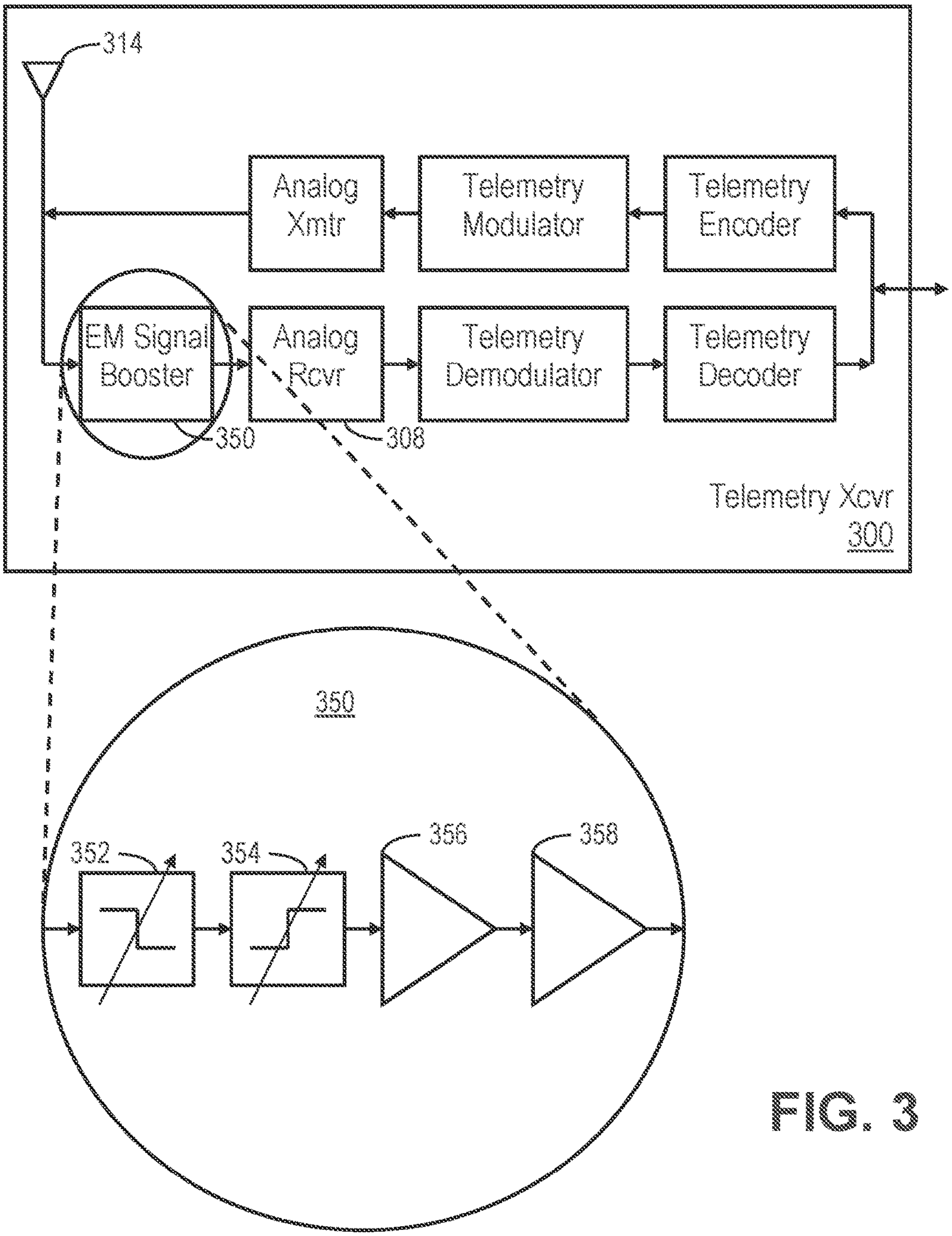
FIG. 3 is a block diagram of a surface system transceiver incorporating an illustrative EM signal booster.

As previously noted, increased borehole depth is accompanied by a decrease in the signal-to-noise ratio (SNR) of the telemetry signal received by surface system 50 from logging tool 26. To improve the SNR of the received signal, in at least some illustrative embodiments an EM signal booster including additional amplifiers and a carefully configured bandpass filter is incorporated into a surface system telemetry transceiver to increase the magnitude of the received signal while reducing noise, increasing the SNR FIG. 3 shows an illustrative embodiment of telemetry transceiver 300 that incorporates an EM signal booster 350. While the embodiment of FIG. 3 shows EM signal booster 350 as an integral component of telemetry transceiver 300, in other illustrative embodiments EM signal booster 350 may be implemented as an add-on standalone inline amplifier coupled between antenna 314 and analog receiver 308 of an existing telemetry transceiver 300.

Continuing to refer to FIG. 3, signal booster 350 includes adjustable low pass filter 352 and adjustable high pass filter 354, which together operate as a bandpass filter. In at least some illustrative embodiments, both filters are implemented using passive components (e.g., resistor-capacitor or R-C networks). A single R-C network is used within each filter to produce a second order bandpass filter. In other illustrative embodiments, additional R-C networks and/or active filters are used to produce a higher order bandpass filter. Each filter is adjusted to provide as narrow a passband as possible while still remaining below the maximum error rate requirements of the logging system, as described in more detail below. Such a narrow passband reduces the level of noise present within the signal propagated through the EM signal booster prior to the signal's amplification by amplifiers 356 and 358.

To provide the preferred narrow passband, the low and high pass filters' cutoff frequencies are each adjusted to narrow the bandwidth of the bandpass filter as much as possible without inducing excessive errors. Such errors can result from a filter that does not provide enough bandwidth for the transmitted communication signal, thus producing a is distortion in the signal that corrupts the data encoding. The minimum bandwidth necessary to avoid such a distortion varies depending on the type of data encoding and modulation used, as well as on the data content itself. Conventional amplifier stages, such as analog receiver 308, typically include a passband filter with a wide passband to induce little or no distortion onto the received signal. The cutoff frequencies for such wideband filters are shown for reference in FIG. 4 as low wideband cutoff frequency $F_{LWide}$ and high wideband cutoff frequency $F_{Hwide}$. Typical values for these frequencies are 15% below the lower −3 dB cutoff frequency and 15% above the upper −3 dB cutoff frequency.

Figure 4:
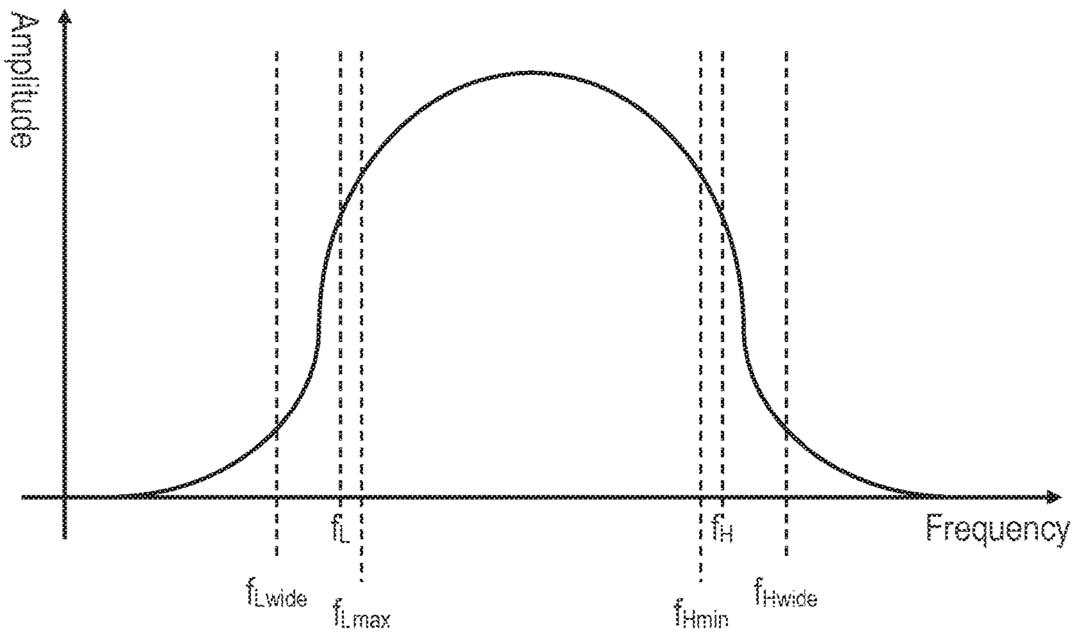
FIG. 4 is a frequency response graph of an illustrative EM signal booster.

As can be seen in FIG. 4, the lower cutoff frequency $f_L$ of EM signal booster 350 is adjusted above the low wideband cutoff frequency until it is just below the maximum low cutoff frequency $f_{Lmax}$. $f_{Lmax}$ is the cutoff frequency for the high pass filter of EM signal booster 350 at which the measured telemetry error rate (also referred to as the measured error rate, or simply error rate) exceeds a predetermined maximum telemetry error rate (also referred to as maximum error rate). The error rate may be expressed, for example, as the number of messages per minute with detected errors, detected and corrected errors, detected errors resulting in discarded messages, etc. The maximum error rate value may be set interactively by a user operating the system, and may be selected using any of a variety of objective and/or subjective criteria such as, for example, minimum vertical data resolution, statistical analysis of accuracy of formation data versus the amount of data discarded due to error, system user experience, etc.

Alternatively, the maximum error rate may be set automatically by the system based upon preprogrammed rules that take into account the above-described criteria. Similarly, the upper cutoff frequency $f_H$ of EM signal booster 350 can be adjusted below the high wideband cutoff frequency until it is just above the minimum high cutoff frequency $f_{Hmin}$. $f_{Hmin}$ is the cutoff frequency for the low pass filter of EM signal booster 350 at which the error rate exceeds the predetermined maximum error rate. Once the filter cutoff frequencies are adjusted, EM signal booster 350 may be placed into operation to provide a telemetry communication signal to analog receiver 308 with an improved SNR relative to the signal present at the input of EM signal booster 350.

Figure 5:
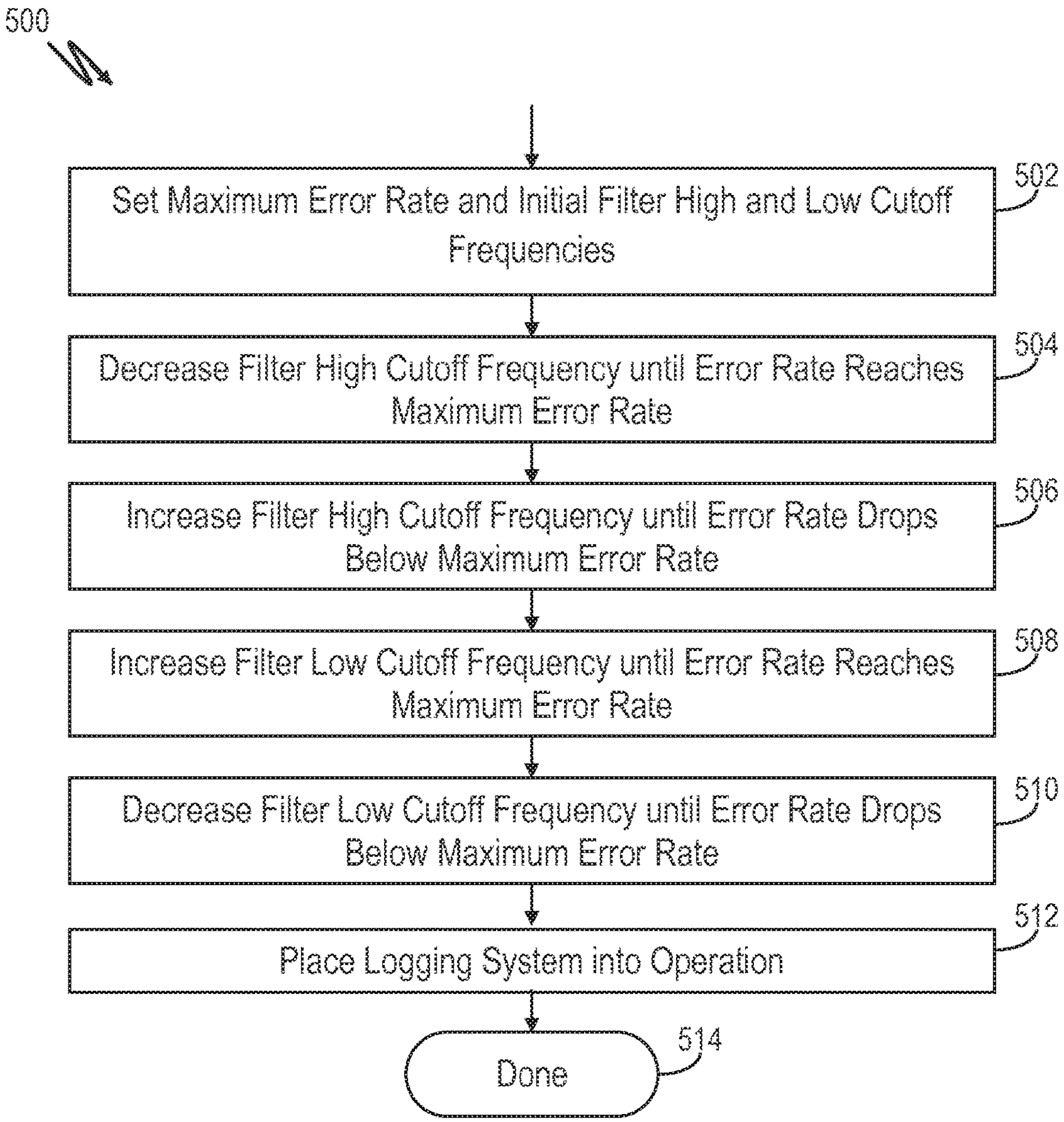
FIG. 5 is a flowchart of an illustrative method for configuring an embodiment of the disclosed EM signal booster.

FIG. 5 is a flowchart of an illustrative method 500 for configuring EM signal booster 350 as described above. The method begins by setting the maximum error rate allowable (block 502) and initializing the bandpass filter's high and low cutoff frequencies to the wideband high cutoff and low cutoff frequencies respectively. While monitoring the actual error rate, the filter's high cutoff frequency is decreased with communications taking place between the logging tool and the surface system until the monitored error rate reaches the maximum error rate (block 504). The filter's high cutoff frequency is then adjusted back up until the error rate drops back below the maximum error rate (e.g., within a threshold range such as within 0.1% of the maximum; block 506). Once the high cutoff frequency adjustment is completed, the filter's low cutoff frequency is increased with communications taking place until the monitored error rate reaches the maximum error rate (block 508). The filter's low cutoff frequency is then adjusted back down until the error rate drops back below the maximum error rate (block 510). Once the adjustments to the filter cutoff frequencies are complete, the logging system is placed into operation (block 512), ending the method (block 514).

It should be noted that although the above-described illustrative method is implemented by first adjusting the high cutoff frequency, then the low cutoff frequency, in other alternative embodiments of the method the order may be reversed. In still other illustrative embodiments, smaller, gradual adjustments may be made to both cutoff frequencies by alternating back and forth between the two adjustments until the error rate is exceeded, and also during the process of dropping back below the error rate.

Figure 6:
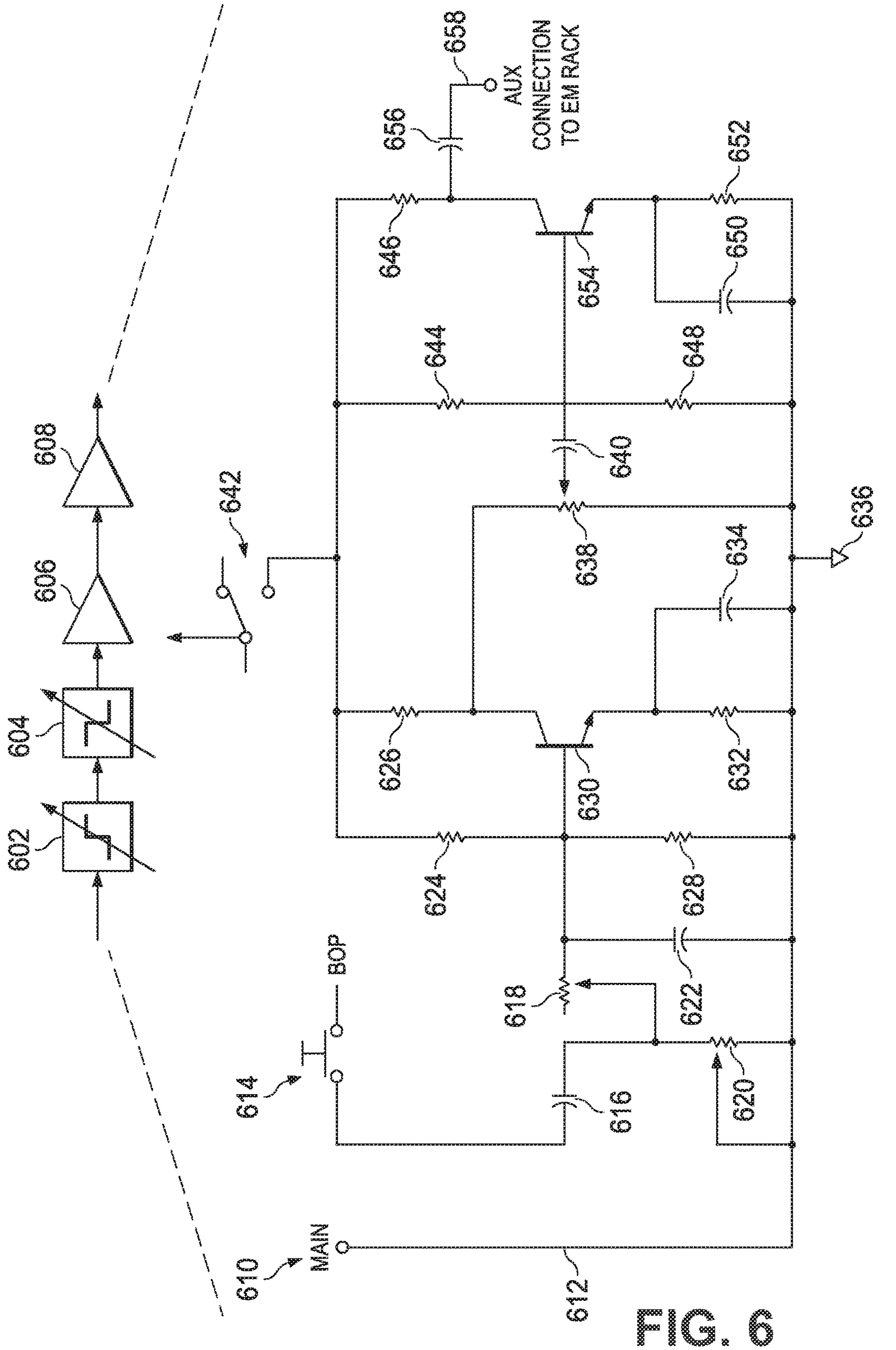
FIG. 6 is a block diagram and circuit diagram of an actual EM signal booster embodiment.

FIG. 6 illustrates a circuit embodying at least some of the techniques described herein. Specifically, FIG. 6 shows a circuit 610 that implements the adjustable high-pass filter 602, the adjustable low-pass filter 604, the first amplifier 606 and the second amplifier 608. The circuit 610 comprises a common connection MAIN 612; a switch 614 through which an incoming signal passes to be filtered and amplified by the circuit 610; capacitor 616 (e.g., 50 micro-farads); potentiometers 618, 620 (e.g., 5 kilo-ohms); capacitor 622 (e.g., 50 micro-farads); resistors 624 (e.g., 142.4 kilo-ohms), 626 (e.g., 7.4 kilo-ohms), 628 (e.g., 15.111 kilo-ohms); n-p-n bipolar junction transistor 630; resistor 632 (e.g., 792 ohms); capacitor 634 (e.g., 1005 micro-farads); ground connection 636; potentiometer 638 (e.g., 10 kilo-ohms); capacitor 640 (e.g., 100 micro-farads); switch 642 to a voltage source; resistors 644 (e.g., 71.2 kilo-ohms), 646 3.7 kilo-ohms), 648 (e.g., 7.555 kilo-ohms); capacitor 650 (e.g., 2009 micro-farads); resistor 652 (e.g., 396 ohms); n-p-n bipolar junction transistor 654; capacitor 656 (e.g., 100 micro-farads); and output connection 658 that couples, for instance, to the auxiliary (AUX) input on an EM rack. The foregoing component values (e.g., resistance and capacitance values) are simply illustrative, and in practice the actual component values may be selected based on the closest available component values or they may be different values altogether.

In general, the operation of the circuit 612 includes the high-pass filtering of an incoming signal by components 616, 620; the low-pass filtering of the signal by components 618, 622; the amplification of the filtered signal using components 624, 626, 628, 630, 632, and 634, which results in a phase-inverted and amplified signal that is provided to the component 638; adjustment of gain by component 638; a DC block by component 640; further amplification and phase-inversion by components 644, 646, 648, 650, 652, and 654; and another DC block by component 656. Thus, in summary, the circuit 610 receives a relatively weak signal; it filters the signal to be within a certain passband using high- and low-pass filters; it amplifies the signal once, which results in a stronger signal with an undesirable 180-degree phase inversion; and it amplifies the signal once again, which results in an even stronger signal that is again inverted by 180 degrees back to the incoming signal's original phase. The resulting signal may be used as desired—for example, it may be provided to an AUX connection on an EM rack via connection 658. Numerous other modifications, equivalents, and alternatives, will become apparent to those skilled in the art once the above disclosure is fully appreciated. For example, although the embodiments disclosed were described within the context of LWD/MWD systems, they are also suitable for use with any downhole system were operation of a wireline system is either infeasible or impractical. Further, although the disclosed embodiments incorporate components that are adjusted manually, other embodiments are contemplated that incorporate electronically adjusted filters, via both analog controls (e.g., varactor diodes) and digital controls (e.g., switched-capacitor filters). Such electronic controls also can provide a basis for dynamic and/or automated adjustment of the filters to compensate for changing conditions as a function of depth and/or electrical noise levels. It is intended that the following claims be interpreted to embrace all such modifications, equivalents, and alternatives where applicable.

At least some embodiments are directed to an electromagnetic (EM) signal booster, comprising: a bandpass filter comprising a high pass filter and a low pass filter coupled to the high pass filter, and further comprising a low cutoff frequency and a high cutoff frequency, both cutoff frequencies being adjustable; a first amplifier coupled to the high pass filter; and a second amplifier coupled to the first amplifier, wherein the high cutoff frequency is adjusted to within a first threshold value above a minimum high cutoff frequency and the low cutoff frequency is adjusted to within a second threshold value below a maximum low cutoff frequency. Such embodiments may be supplemented in a variety of ways, including by one or more of the following concepts, in any order and in any combination: wherein said first and second threshold values are such that, after said adjustments, a maximum telemetry error rate exceeds a measured telemetry error rate by at least 0.1% of the maximum telemetry error rate; wherein the maximum telemetry error rate is set based on factors selected from the group consisting of minimum vertical data resolution and statistical analysis of accuracy of formation data versus an amount of data discarded due to error; wherein, to process an EM telemetry signal, the bandpass filter filters and the first and second amplifiers amplify the EM telemetry signal, wherein each of the first and second amplifiers comprises a bipolar junction transistor.

At least some embodiments are directed to a method for operating an electromagnetic (EM) signal booster, comprising: determining a maximum telemetry error rate; providing an EM signal booster including an adjustable bandpass filter having a high cutoff frequency and a low cutoff frequency; setting the high cutoff frequency to a value below which a measured telemetry error rate would meet or exceed the maximum telemetry error rate; setting the low cutoff frequency to a different value above which the measured telemetry error rate would meet or exceed the maximum telemetry error rate; after setting the high and low cutoff frequencies, using the EM signal booster to process EM telemetry signals; and using the processed EM telemetry signals to generate a display of information. Such embodiments may be supplemented in a variety of ways, including by one or more of the following concepts, in any order and in any combination: wherein said EM signal booster is installed in a telemetry receiver system at the surface and the EM telemetry signals are received at the EM signal booster from a downhole tool; wherein said measured telemetry error rate is based on said EM telemetry signals; further comprising: prior to setting the high cutoff frequency to said value, decreasing the high cutoff frequency from an initial value until the measured telemetry error rate exceeds the maximum telemetry error rate; wherein, when the high cutoff frequency is set to said value, the maximum telemetry error rate exceeds the measured telemetry error rate by a predetermined threshold; wherein said predetermined threshold is 0.1% of the maximum telemetry error rate; further comprising: prior to setting the low cutoff frequency to said s different value, increasing the low cutoff frequency from an initial value until the measured telemetry error rate exceeds the maximum telemetry error rate; wherein, when the low cutoff frequency is set to said different value, the maximum telemetry error rate exceeds the measured telemetry error rate by a predetermined threshold; wherein the predetermined threshold is 0.1% of the maximum telemetry error rate; wherein using the EM signal booster to process EM telemetry signals comprises filtering and amplifying said EM telemetry signals; wherein the maximum telemetry error rate is set based on factors selected from the group consisting of minimum vertical data resolution and statistical analysis of accuracy of formation data versus an amount of data discarded due to error.

At least some embodiments are directed to a logging system that comprises: a drill string, positioned in a wellbore, that houses a measurement device to obtain downhole measurements and that further houses a first telemetry transceiver to communicate the downhole measurements; and a surface system housing a second telemetry transceiver to receive the downhole measurements from the first telemetry transceiver, said second telemetry transceiver comprising a bandpass filter and at least one amplifier coupled to the bandpass filter, wherein the bandpass filter includes a high pass filter and a low pass filter coupled to the high pass filter, and wherein the bandpass filter further includes a low cutoff frequency and a high cutoff frequency, both cutoff frequencies being adjustable, wherein the high cutoff frequency is adjusted to within a first threshold value above a minimum high cutoff frequency and the low cutoff frequency is adjusted to within a second threshold value below a maximum low cutoff frequency. These embodiments may be supplemented with one or more of the following concepts, in any order and combination: wherein the amplifier is to invert the phase of a downhole measurement signal received by the second telemetry transceiver; wherein the amplifier comprises a bipolar junction transistor; wherein, within the second telemetry transceiver, the bandpass filter and the amplifier are positioned upstream of a telemetry demodulator.

What is claimed is:

1. An electromagnetic (EM) signal booster, comprising:
a bandpass filter comprising a high pass filter and a low pass filter coupled to the high pass filter, and further comprising a low cutoff frequency and a high cutoff frequency, both cutoff frequencies being adjustable;
a first amplifier coupled to the high pass filter to amplify a filtered signal from the bandpass filter; and
a second amplifier coupled to the first amplifier to further amplify the filtered signal from the band pass filter, wherein the high cutoff frequency is independently adjusted to within a first threshold value above a minimum high cutoff frequency and the low cutoff frequency is independently adjusted to within a second threshold value below a maximum cutoff frequency, wherein said first and second threshold values are such that, after said adjustments, a maximum telemetry error rate exceeds a measured telemetry error rate by at least 0.1% of the maximum telemetry error rate, wherein the maximum telemetry error rate is set based on factors selected from the group consisting of minimum vertical data resolution and statistical analysis of accuracy of formation data versus an amount of data discarded due to error.

2. The EM signal booster of claim 1, wherein, to process an EM telemetry signal, the bandpass filter filters and the first and second amplifiers amplify the EM telemetry signal.

3. The EM signal booster of claim 1, wherein each of the first and second amplifiers comprises a bipolar junction transistor.

4. A method for operating an electromagnetic (EM) signal booster, comprising:
determining a maximum telemetry error rate;
providing an EM signal booster including an adjustable bandpass filter having a high cutoff frequency;
independently setting the high cutoff frequency to a value below which a measured telemetry error rate would meet or exceed the maximum telemetry error rate;
independently setting the low cutoff frequency to a different value above which the measured telemetry error rate would meet or exceed the maximum telemetry error rate;
after independently setting the high and low cutoff frequencies, using the EM signal booster to process EM telemetry signals; and
using the processed EM telemetry signals to generate a display of information.

5. The method of claim 4, wherein said EM signal booster is installed in a telemetry receiver system at the surface and the EM telemetry signals are received at the EM signal booster from a downhole tool.

6. The method of claim 5, wherein said measured telemetry error rate is based on said EM telemetry signals.

7. The method of claim 4, further comprising:

prior to setting the high cutoff frequency to said value, decreasing the high cutoff frequency from an initial value until the measured telemetry error rate exceeds the maximum telemetry error rate.

8. The method of claim 7, wherein, when the high cutoff frequency is set to said value, the maximum telemetry error rate exceeds the measured telemetry error rate by a predetermined threshold.

9. The method of claim 8, wherein said predetermined threshold is 0.1% of the maximum telemetry error rate.

10. The method of claim 4, further comprising:

prior to setting the low cutoff frequency to said different value, increasing the low cutoff frequency from an initial value until the measured telemetry error rate exceeds the maximum telemetry error rate.

11. The method of claim 10, wherein, when the low cutoff frequency is set to said different value, the maximum telemetry error rate exceeds the measured telemetry error rate by a predetermined threshold.

12. The method of claim 11, wherein the predetermined threshold is 0.1% of the maximum telemetry error rate.

13. The method of claim 4, wherein using the EM signal booster to process EM telemetry signals comprises filtering and amplifying said EM telemetry signals.

14. The method of claim 4, wherein the maximum telemetry error rate is set based on factors selected from the group consisting of minimum vertical data resolution and statistical analysis of accuracy of formation data versus an amount of data discarded due to error.

15. A logging system, comprising:

a drill string, positioned in a wellbore, that houses a measurement device to obtain downhole measurements and that further houses a first telemetry transceiver to communicate the downhole measurements; and a surface system housing a second telemetry transceiver to receive the downhole measurements from the first telemetry transceiver, said second telemetry transceiver comprising a bandpass filter, a first amplifier coupled to the bandpass filter to amplify a filtered signal from the bandpass filter, and a second amplifier coupled to the first amplifier to further amplify the filtered signal from the band pass filter, wherein the bandpass filter includes a high pass filter and a low pass filter coupled to the high pass filter, and wherein the bandpass filter further includes a low cutoff frequency and a high cutoff frequency, both cutoff frequencies being independently adjustable, wherein the high cutoff frequency is independently adjusted to within a first threshold value above a minimum high cutoff frequency and the low cutoff frequency is independently adjusted to within a second threshold value below a maximum low cutoff frequency.

16. The logging system of claim 15, wherein the amplifier is to invert the phase of a downhole measurement signal received by the second telemetry transceiver.

17. The logging system of claim 15, wherein the amplifier comprises a bipolar junction transistor.

18. The logging system of claim 15, wherein, within the second telemetry transceiver, the bandpass filter and the amplifier are positioned upstream of a telemetry demodulator.

* * * * *